(12) United States Patent
Roth et al.

(10) Patent No.: US 9,071,429 B1
(45) Date of Patent: Jun. 30, 2015

(54) REVOCABLE SHREDDING OF SECURITY CREDENTIALS

(71) Applicant: Amazon Technologies, Inc., Reno, NV (US)

(72) Inventors: Gregory Branchek Roth, Seattle, WA (US); Matthew James Wren, Seattle, WA (US); Eric Jason Brandwine, Haymarket, VA (US)

(73) Assignee: Amazon Technologies, Inc., Reno, NV (US)

( * ) Notice: Subject to any disclaimer, the term of this patent is extended or adjusted under 35 U.S.C. 154(b) by 28 days.

(21) Appl. No.: 13/873,083

(22) Filed: Apr. 29, 2013

(51) Int. Cl.
*H04L 9/08* (2006.01)
*H04L 29/06* (2006.01)
*H04L 9/32* (2006.01)

(52) U.S. Cl.
CPC ............. *H04L 9/0894* (2013.01); *H04L 9/3268* (2013.01); *H04L 9/0822* (2013.01); *H04L 9/0891* (2013.01); *H04L 63/0428* (2013.01)

(58) Field of Classification Search
CPC ............ G06F 2221/0771; H04L 9/08–9/0897; H04L 63/0428
USPC .................. 713/150, 158; 380/286; 726/6, 18
See application file for complete search history.

(56) References Cited

U.S. PATENT DOCUMENTS

| | | | |
|---|---|---|---|
| 6,044,155 A * | 3/2000 | Thomlinson et al. ......... 713/155 |
| 6,549,626 B1 * | 4/2003 | Al-Salqan ..................... 380/286 |
| 7,921,299 B1 | 4/2011 | Anantha et al. |
| 8,565,422 B2 * | 10/2013 | Lee et al. ........................ 380/44 |
| 8,769,274 B2 * | 7/2014 | Chao ............................. 713/167 |
| 2003/0167197 A1 | 9/2003 | Shoemaker et al. |
| 2004/0260651 A1 | 12/2004 | Chan et al. |
| 2006/0122946 A1 * | 6/2006 | Fahrny et al. .................... 705/71 |
| 2007/0240206 A1 | 10/2007 | Wu et al. |
| 2008/0144825 A1 * | 6/2008 | Dias et al. ..................... 380/259 |
| 2008/0192940 A1 * | 8/2008 | Feng et al. .................... 380/286 |
| 2009/0150985 A1 | 6/2009 | Chan et al. |
| 2009/0249439 A1 | 10/2009 | Olden et al. |
| 2009/0249440 A1 | 10/2009 | Platt et al. |
| 2011/0145357 A1 | 6/2011 | Saeed |
| 2011/0191831 A1 | 8/2011 | Chan et al. |
| 2011/0258692 A1 | 10/2011 | Morrison et al. |
| 2012/0117183 A1 | 5/2012 | Wong et al. |
| 2012/0144023 A1 | 6/2012 | Guest et al. |

(Continued)

OTHER PUBLICATIONS

Shamir's Secret Sharing From Wikipedia, the free encyclopedia As crawled by Wayback Machine on Aug. 2, 2010.*

(Continued)

*Primary Examiner* — Christopher Revak
*Assistant Examiner* — Vadim Savenkov
(74) *Attorney, Agent, or Firm* — Hogan Lovells US LLP

(57) ABSTRACT

Customers accessing resources and/or data in a multi-tenant environment can obtain assurance that a provider of that environment will honor only requests associated with the customer. A multi-tenant cryptographic service can be used to manage cryptographic key material and/or other security resources in the multi-tenant environment. The cryptographic service can provide a mechanism in which the service can receive requests to use the cryptographic key material to access encrypted customer data, export key material out of the cryptographic service, destroy key material managed by the cryptographic service, among others. Such an approach can enable a customer to manage key material without exposing the key material outside a secure environment.

22 Claims, 7 Drawing Sheets

(56) References Cited

U.S. PATENT DOCUMENTS

| | | |
|---|---|---|
| 2012/0166818 A1 | 6/2012 | Orsini et al. |
| 2012/0233668 A1 | 9/2012 | Leafe et al. |
| 2012/0265976 A1 | 10/2012 | Spiers et al. |
| 2012/0266231 A1 | 10/2012 | Spiers et al. |
| 2013/0148810 A1* | 6/2013 | Goel et al. .................. 380/278 |
| 2013/0205028 A1 | 8/2013 | Crockett et al. |
| 2013/0212367 A1* | 8/2013 | Ingalls et al. .................... 713/2 |
| 2013/0238785 A1 | 9/2013 | Hawk et al. |
| 2013/0247034 A1 | 9/2013 | Messerli |
| 2013/0304903 A1 | 11/2013 | Mick et al. |
| 2014/0050317 A1* | 2/2014 | Sabin .............................. 380/44 |
| 2014/0208100 A1* | 7/2014 | Kendall ........................ 713/164 |

OTHER PUBLICATIONS

"Non-Final Office Action dated Nov. 25, 2013," U.S. Appl. No. 13/682,318, 13 pages.

"Final Office Action dated Jun. 25, 2014," U.S. Appl. No. 13/682,318, 14 pages.

"Non-Final Office Action dated Oct. 6, 2014," U.S. Appl. No. 13/682,318, 16 pages.

"Non-Final Office Action dated Dec. 13, 2013," U.S. Appl. No. 13/682,248, 28 pages.

"Final Office Action dated May 8, 2014," U.S. Appl. No. 13/682,248, 35 pages.

"Non-Final Office Action dated Oct. 31, 2014," U.S. Appl. No. 13/682,248, 36 pages.

* cited by examiner

REVOCABLE SHREDDING OF SECURITY CREDENTIALS

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A customer typically will rent, lease, or otherwise pay for access to resources through the cloud, such that the customer does not have to purchase and maintain the hardware and/or software to provide access to these resources. A potential disadvantage to such an approach, at least from a customer point of view, is that the resources typically are at a location under control of the provider of those resources, and thus are out of the direct control of the customer. In order to help ensure that resources allocated to the customer perform tasks only under direction of that customer, the provider environment can support request authentication to prevent unauthorized parties from accessing the resources. Such a service might include a multi-tenant key management service that maintains and manages one or more cryptographic keys owned by a customer. It is often the case, however, that customers would like some assurance that the service provider can guarantee against unauthorized access to the customer's data. This can include, for example, complying with lawful order to disclose data stored by the service provider, which can result in the keys and underlying data being exposed.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the foregoing or other deficiencies experienced in conventional approaches to managing security in an electronic environment. In particular, various embodiments provide mechanisms for utilizing a secret management service to manage secrets, such as cryptographic key material and/or other security resources or credentials, as well as ensuring authorized access to those secrets. In various embodiments, the secret management service provides a mechanism by which the service can receive requests to use cryptographic key material, for example, to access customer data encrypted under that key material, export encrypted data and/or key material out of the secret management service without exposing the key material, or destroy key material managed by the secret management service, among others. In various embodiments, activities that directly require use of key material under control of the secret management service can be performed through application programming interfaces (APIs) that enable one or more cryptographic operations to check-in, check-out, delete, and/or suspend key material. Such functionality can, for example, advantageously ensure that key material cannot be extracted in a way that it can be used without some level of policy enforcement and/or audit trail provided by the service.

In various embodiments, a customer may want to remove or otherwise suspend use of key material by the secret management service for some period of time, such as to limit the possibility of data exposure under various circumstances such as for licensing or other concerns. In such instances, a secret such as a restore key can be created and used to encrypt the key material, along with any metadata (e.g., policies) for the key material. The key material, encrypted with the restore key, then can be provided to the customer and the key material under control of the cryptographic service can be shredded or otherwise deleted. The secret management service would instead store a copy of the restore key. If the secret management service is required to disclose data it stores, the provider would at most disclose the restore key, but would not be able to disclose the key material as the provider no longer stores a copy of that material. If the customer subsequently desires to restore the key material to the secret management, the customer can provide the encrypted key material back to the secret management service, and the service can decrypt the encrypted key material using the restore key such that the key material can be used to access one or more resources and/or data secured by the key material.

Various other functions and advantages are described and suggested below as may be provided in accordance with the various embodiments.

Figure 1:
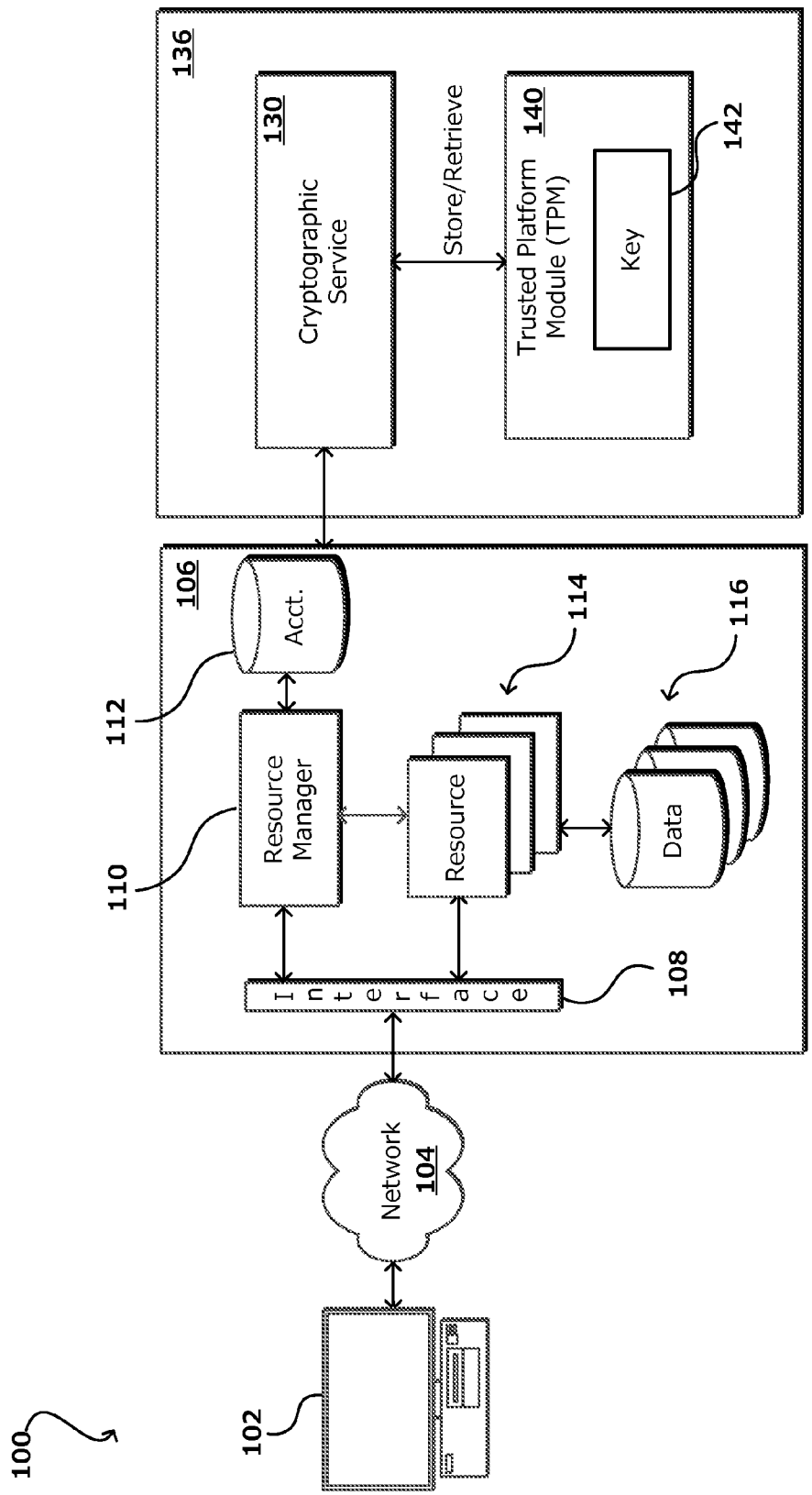
FIG. 1 illustrates an example environment in which aspects of the various embodiments can be implemented, in accordance with an embodiment.

FIG. 1 illustrates an example environment 100 in which aspects of the various embodiments can be implemented. In this example a user, such as a customer of a provider of at least a portion of the environment, is able to utilize a client device 102 to communicate across at least one network 104 with a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The network(s) 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users or applications for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example, the provider environment includes a plurality of resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, an application executing on the client device 102 that needs to access or utilize a portion of the resources 114, which might be exposed as one or more services to which the application has subscribed, can submit a request that is received to an interface layer 108 of the provider environment 106. The interface layer can include application programming interfaces (APIs) or other exposed interfaces enabling a user to submit requests, such as Web service requests, to the provider environment. The interface layer 108 in this example can also include other components as well, such as at least one Web server, routing components, load balancers, and the like. When a request to access a resource is received at the interface layer 108 in some embodiments, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshaling or un-marshaling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

A host machine 136 in at least one embodiment can include a multi-tenant cryptographic service or other key management service 130 and a trusted platform module 140. In at least one embodiment, the cryptographic service can manage customer cryptographic key information or other customer key material used for protecting customer data by authenticating and authorizing customer requests for cryptographic material and/or operations. The trusted platform module, for example, can provide secure key storage and cryptographic operations.

In accordance with an embodiment, the cryptographic service can store one or more keys 142 (herein also known as key material, cryptographic keys, keys) in the trusted platform module 140 for one or more customers. Cryptographic operations which access encrypted customer data will invoke APIs on the cryptographic service to decrypt that data using customer keys stored in the trusted platform module. For example, the service can receive requests to use the keys to access encrypted customer data, to export key material out of the cryptographic service, to destroy key material managed by the cryptographic service, among others. In at least some embodiments, the customer can access or utilize the cryptographic service by submitting a request that is received by the interface layer 108. It should be noted that although host machine 136 is shown outside the provider environment, in accordance with various embodiments the cryptographic service and the trusted platform can both be included in provider environment 106, while in other embodiments, one or the other can be included in the provider environment.

As mentioned, however, certain customers might want more assurance that key material stored in the trusted platform module cannot be extracted in a way that it can be used without some level of policy enforcement and/or audit trail provided by the service. Further, at least some customers might find it desirable that for some particular interval of time key material is not accessible by the cryptographic service. That can be due to a number of considerations, for example, licensing considerations wherein a license agreement for use of particular material is temporarily suspended or otherwise requires a customer to not be able to access particular data, and/or security considerations wherein a customer may not need such cryptographic services for a particular interval of time and prefers to remove key material from the cryptographic service and/or permanently destroy key material. Unfortunately such destruction may be inadvertent or at some point later the customer may realize that they did not want the key material destroyed.

In accordance with various embodiments, by instead temporally suspending use of the key material such that the resource provider loses all access to it, the customer can maintain the key material (e.g., in an encrypted form that cannot be used outside the provider environment), and at some other point in time, can provide the key material back to the resource provider to reinstate the suspended key material. Accordingly, in accordance with various embodiments, when a customer desires to remove or otherwise suspend key material under management of the cryptographic service, such key material can be provided to the customer (i.e., in encrypted form), and the related key material under control of the cryptographic service shredded or otherwise deleted. If the customer later desires to restore the key material in their possession, the customer can provide the key material to the service, wherein the service can decrypt the key material such that the key material can be used by the customer. Various other applications, processes, and uses are presented below with respect to the various embodiments.

FIGS. 2(a), 2(b), 2(c), and 2(d) illustrate an example multi-tenant cryptographic service that stores and manages customer cryptographic key material and/or other security resources, in accordance with various embodiments. As described, in such a service, cryptographic operations which access encrypted customer data can invoke APIs on the cryptographic service to decrypt customer data using customer key material managed by the cryptographic service. In various embodiments, a customer can cause the cryptographic service to perform export and import operations on the key material. Additionally, the user can cause the cryptographic service to destroy customer key material managed by the cryptographic service. In accordance with an embodiment, destroying key material may range from destroying at least one copy of key material, to using one or more operations overriding some or all copies of the key material in some or all system components such that the key material cannot be retrieved without a level of effort greater than before when the key was destroyed.

Figure 2A:
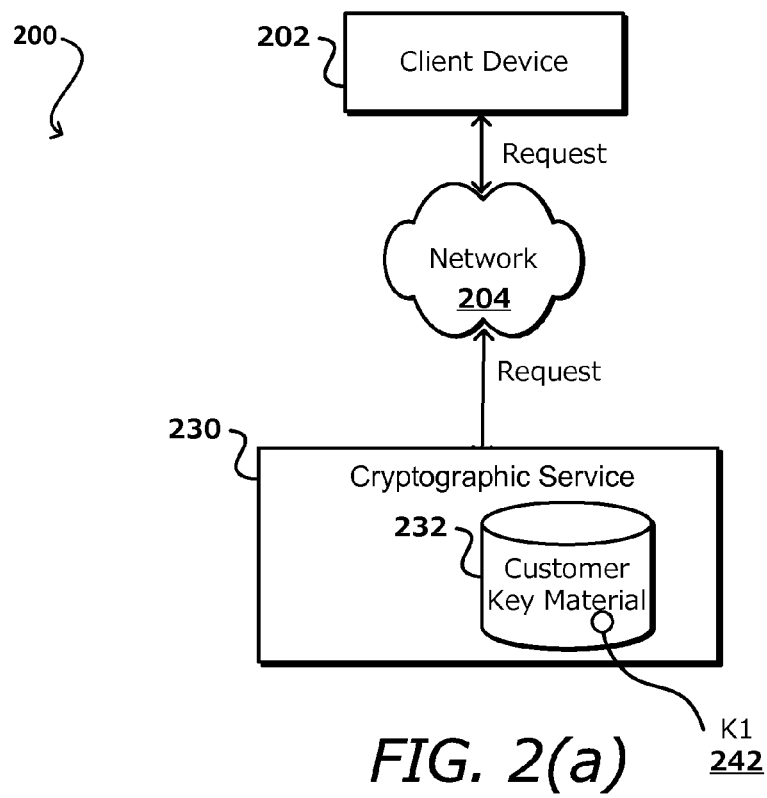
FIGS. 2(a), 2(b), 2(c), and 2(d) illustrate an example multi-tenant cryptographic service to store and manage customer cryptographic key material and/or other security resources.
Figure 2B:
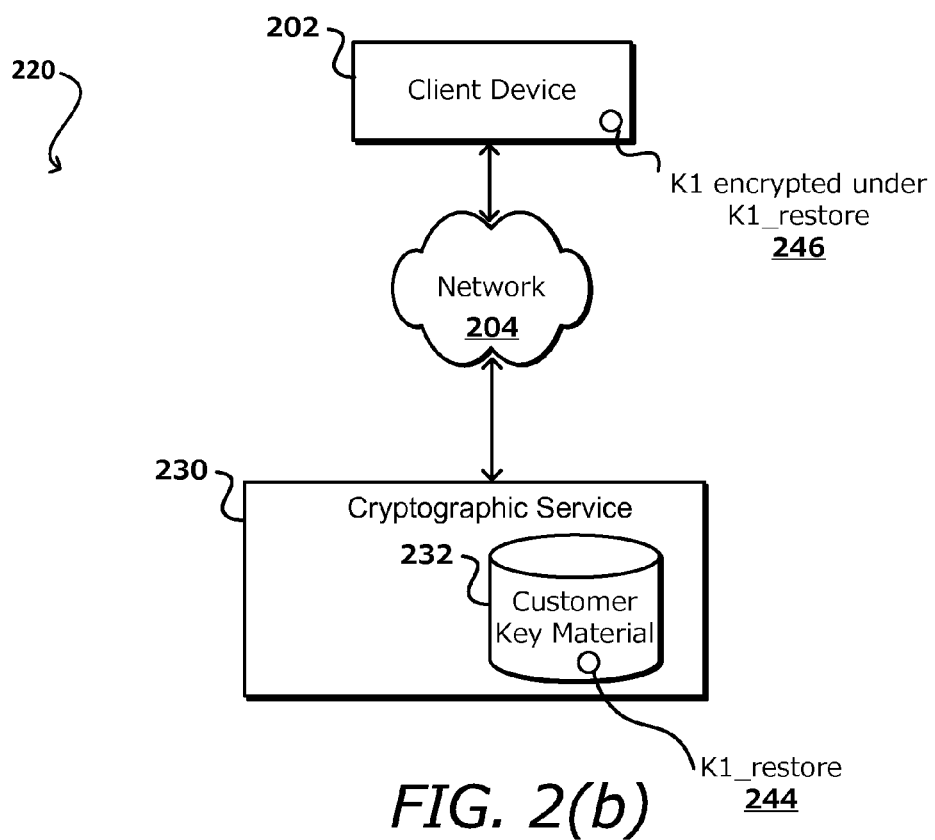
Figure 2C:
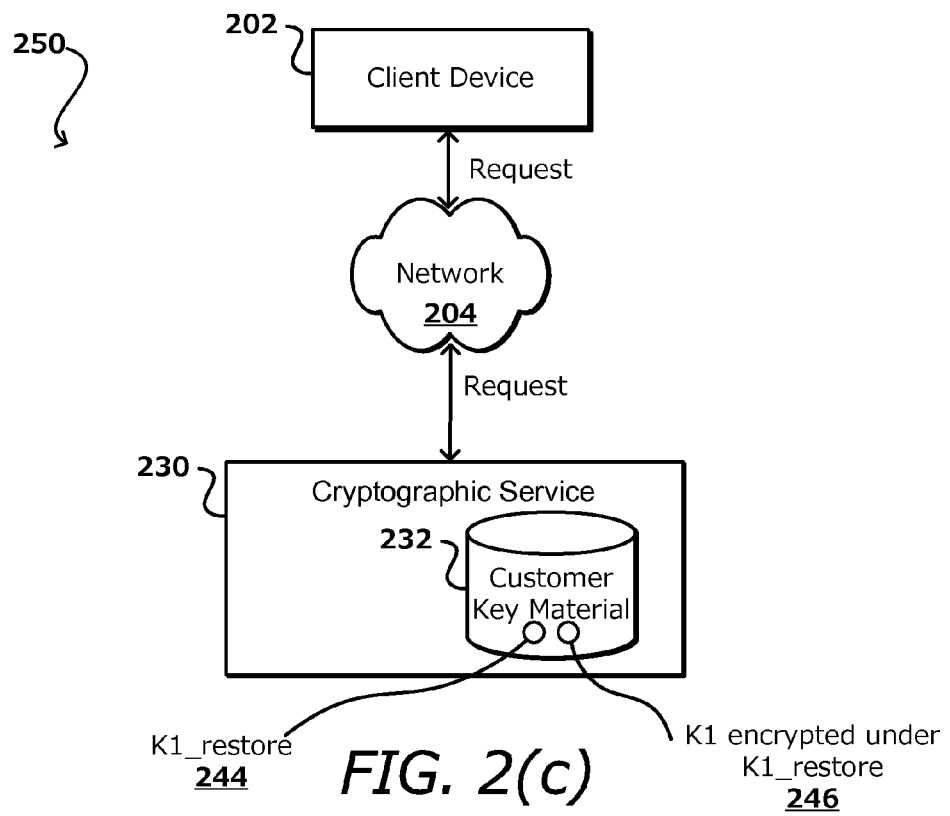
Figure 2D:
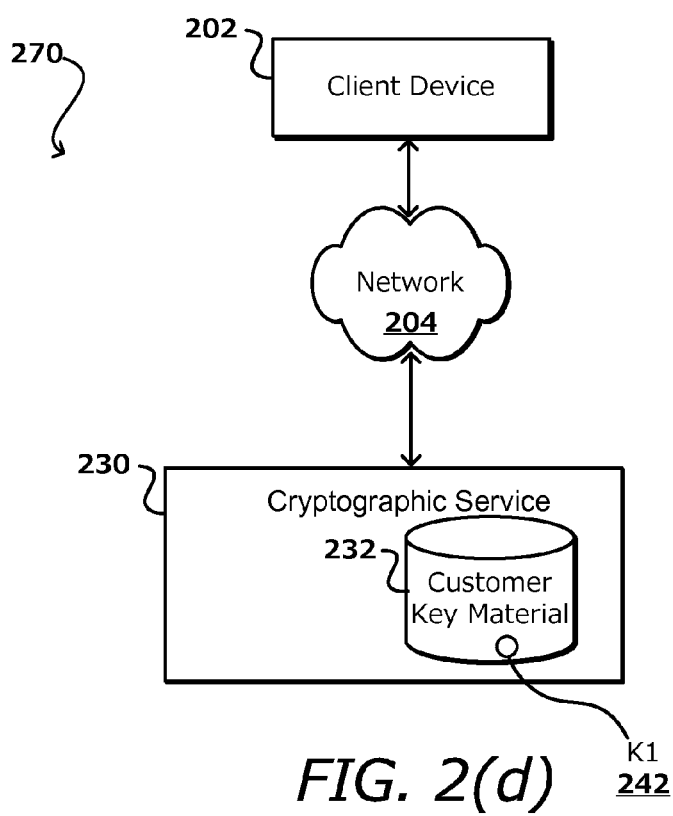

As shown in situation 200 in FIG. 2(a), a customer is able to utilize a client device 202 to communicate across at least one network 204 with a multi-tenant cryptographic service 230. As described, the cryptographic service manages one or more customer cryptographic keys and/or other security resources, where the cryptographic keys and/or other security resources cannot be directly exported out of the service (i.e., without first being encrypted), and can be provided in a resource provider environment (such as resource provider environment 106). A customer has an account including at least one key, "K1 242", managed by the cryptographic service, the resource provider environment, or another entity. K1 and other customer key information and/or security information such as metadata can be stored in at least one database 232 managed by the cryptographic service. When the customer makes a request to the cryptographic service calling a suspend API, K1 242 can be exported to the customer in an encrypted form. For example, as shown in situation 220 in FIG. 2b), in response to such a request, the cryptographic service creates a restore key, "K1_restore 244" or other such key in the account of the customer, where K1_restore 244 is used to encrypt K1 242 along with at least a portion of the metadata associated with K1 242 using any known cryptography. The metadata, in various embodiments, can include policies associated with K1, an identifier of an account in which K1 is present, the name of K1, history information regarding usage of K1, audit information, or any other information associated with K1 and/or the customer. In some embodiments, at least a portion of the metadata can be associated with K1_restore, where initiating a suspend request can cause the metadata to be updated with audit information, such as a time of initiating the suspend request, an identifier of a customer initiating the suspend request, location information of the customer initiating the suspend request, etc. The metadata can be encrypted and a copy of the encrypted metadata can be retained at the key management service.

Having created K1_restore 244 and encrypting K1 under K1_restore, the cryptographic service exports K1 as encrypted under K1_restore 246 to the client device and at least a portion of the associated metadata. Additionally or alternatively, as described, such metadata can be preserved in the cryptographic service or some other service and only K1 as encrypted under K1_restore 246 is exported. The cryptographic service or other service of the resource provider environment then marks K1 242 as pending deletion. In response to the customer acknowledging receipt of K1 as encrypted under K1_resore 246, the cryptographic service shreds K1 242, at which point the cryptographic service no longer has any record of K1 242. In the event that the customer fails to receive K1 as encrypted under K1_restore 246, the customer can, in some embodiments, request the export API again, which can return the same value (i.e., K1 as encrypted under K1_restore 246) such that a failed connection will not cause an irrevocable loss of data.

At some later point in time, the customer may desire to access data encrypted by K1 242. Accordingly, the customer can call an import API, passing K1 as encrypted under K1_restore 246 to the cryptographic service. For example, in situation 250 in FIG. 2(c), the customer calls the import API and passes K1 as encrypted under K1_restore 246 to the cryptographic service. In this situation, one or more authentication encryption algorithms can use K1_restore 244 to decrypt K1 as encrypted under K1_restore 246 to determine K1 242. Further, the cryptographic service can use any metadata associated with K1 242, either by consulting the database 232, or by analyzing the data encoded in the key material attempting to be imported to authorize the decryption of K1 as encrypted under K1_restore 246. For example, the contents of the metadata included in the restore request can be compared to the contents of the metadata stored at the key management service, where the contents can indicate customers authorized to perform a restore request, requirements of such a request such as timing requirements, quorum requirements, among others. Additionally, authorizing the restore request can include ensuring that copies of the metadata include substantially the same information, where different information between the copies of the metadata can cause the restore operation to abort.

In some embodiments, in response to the import, the cryptographic service may irrevocably shred K1_restore 244 to ensure that if K1 242 is exported again, there is only one version that can be imported, while in other embodiments, it may be possible to import a key having different versions of encryption. After the import, K1 242 is available for use, as shown in situation 270 in FIG. 2(d), by the customer such that the customer can access data encrypted by K1 242.

Figure 3:
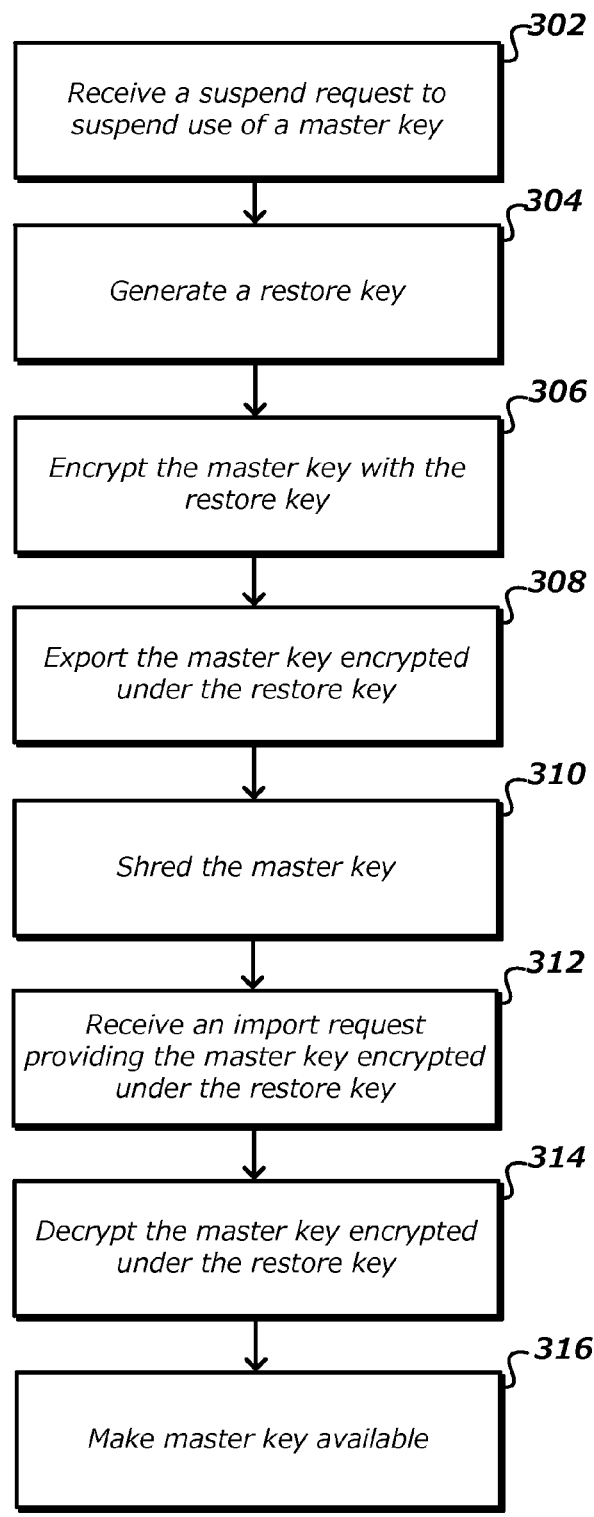
FIG. 3 illustrates an example process for managing a cryptographic key, in accordance with various embodiments.

FIG. 3 illustrates an example process for managing a cryptographic key, in accordance with an embodiment. It should be understood that, for any process described herein, that there can be additional or fewer steps performed in similar or alternative orders, or in parallel, within the scope of the various embodiments unless otherwise stated. A secret, such as cryptographic key material and/or other security resources or credentials is stored for a customer in a data store managed by a key management service, such as a cryptographic service. The customer can make a request 302 to the cryptographic service calling a suspend API to suspend storage of the cryptographic key by the key management service. In such a case, the customer's key (i.e., a master key) can be encrypted and exported out of the cryptographic service. For example, in response to the suspend request, the cryptographic service generates 304 a new key (e.g., a restore key) to be associated with the customer, and the restore key is used to encrypt 306 the master key along with at least a portion of the metadata associated with the master key. Having generated the restore key and encrypting the master key with the restore key, the cryptographic service exports 308 the encrypted master key to the customer. In some instances, the encrypted master key is retained at the cryptographic service and the restore key is provided to the customer. In accordance with various embodiments, customer cryptographic keys (e.g., such as master keys, restore keys, rotate keys, among others) can be associated with information usable to determine which of the cryptographic operations is supported, which may be a policy, a usage bit, etc. For example, the restore key can include usage bits indicating that it is only usable for import/export of key material. In accordance with other embodiments, once the export is completed, the usage bits permitting the export of key material can be cleared such that the restore key is then only usable to import customer key material.

The cryptographic service marks or otherwise flags the master key as pending deletion, and in response to the customer acknowledging receipt of the encrypted master key, the cryptographic service shreds 310 or otherwise destroys at least one copy of the master key stored by the cryptographic service, at which point the cryptographic service is unable to provide a copy of the master key and requests to perform operations using the master key can no longer be satisfied. In the event that the customer fails to receive the encrypted master key, the customer can again request the export API, which will return the same value (e.g., the master key as encrypted under the restore key) such that a failed connection will not cause an irrevocable loss of data, for example, because the master key cannot be recovered. In other embodiments, if an acknowledgement receipt is not received within a predetermined period of time from exporting the encrypted master key (e.g., 5 minutes), the encrypted master key can automatically be exported to the customer to one or more predetermined locations.

At some later point in time, the customer may desire to access data encrypted by the master key. Accordingly, the customer can call 312 an import API, or other restore request, to cause the cryptographic service to store a copy of the cryptographic key, where the restore request includes a copy of the master key as encrypted under the restore key (or the restore key in the instance the restore key was provided to the customer). The copy of the master key encrypted under the restore key is decrypted 314 using the restore key, and the master key is stored in the cryptographic service on behalf of the customer. The master key is made available 316 to the customer, where the customer can invoke APIs on the cryptographic service to decrypt/encrypt customer data using the restored master key.

In accordance with various embodiments, a security conscious customer may desire to rotate (e.g., change) the key material used to encrypt the master key. For example, in the instance where a master key is encrypted under a restore key, the restore key can be encrypted under some other key material (e.g., a rotate key), and the rotate key can be rotated periodically. In this situation, the customer maintains in their possession the master key encrypted under the restore key. The restore key can be encrypted under a rotate key, and the restore key encrypted under the rotate key can be provided to the customer. When the customer provides the restore key encrypted under the rotate key to the cryptographic service, the restore key is decrypted using the rotate key, encrypted under a second rotate key, and provided to the customer. Accordingly, the customer maintains the master key encrypted under the restore key and the restore key encrypted under the second rotate key, and the cryptographic service maintains the second rotate key. This process can continue such that the key material used to encrypt the master key is rotated periodically.

In another embodiment, the restore key can be rotated in a fixed interval for a predetermined period of time and provided to the customer or to a party designated by the customer. For example, the restore key can be encrypted under a first rotate key and the restore key encrypted under the first rotate key can be provided to the customer. After some period of time, the restore key can be encrypted under a second rotate key, and the restore key encrypted under the second rotate key can be provide to the customer. This process can continue for a designated number of rotations, for a certain amount of time, or some other rotation pattern. In yet another embodiment, the customer can provide the master key encrypted under the restore key in exchange for a master key encrypted under a second restore key. It should be noted that the described examples are not to be taking as limiting, and that various other approaches to rotating key material can be implemented in accordance with the various embodiments described herein.

In various other embodiments, in addition to, or instead or rotating key material used to encrypt other key material, a customer may elect to have the restore key expire after a determined period of time, e.g., such as when the customer fails to replace the master key encrypted under the restore key with a master key encrypted under a different restore key. Additionally or alternatively, in accordance with an embodiment, time sensitive metadata can be included with the master key encrypted with the restore key such that an encrypted master key cannot be authenticated due to expired metadata after a defined period of time if the master key is not updated with a different encryption, such as by being encrypted under a different restore key.

Figure 4:
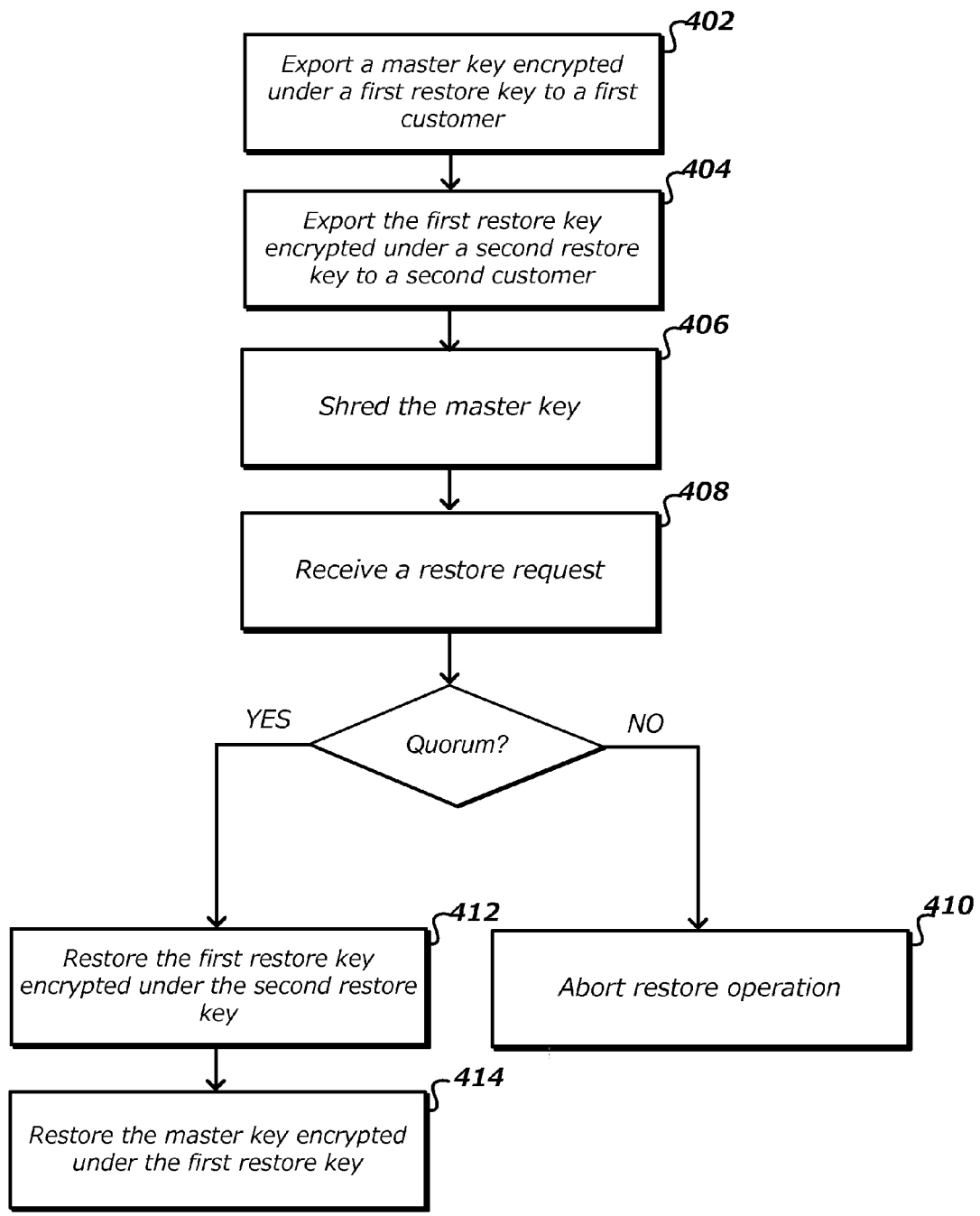
FIG. 4 illustrates an example process for restoring key material in a multi-tenant environment, in accordance with an embodiment.

FIG. 4 illustrates an example process for restoring key material in a multi-tenant environment, in accordance with an embodiment. As described in FIG. 3, the customer can call an import API, wherein the customer passes the encrypted master key to the cryptographic service to be restored. However, in some instances, a customer may require a quorum to perform the restore of the master key, for example, by setting a policy, usage bit, or some other user preference setting that requires the restore of the master key to be authorized by multiple parties. In such a situation, encrypted key material is provided to two or more customers, and the encrypted key material is required to restore the master key. For example, a master key encrypted under a first restore key can be provided 402 to a first customer and the first restore key encrypted under a second restore key can be provided 404 to a second customer, wherein the first customer and the second customer are authorized users of the key material. Upon receiving receipt of the restore material from the first customer and the second customer, the master key is shredded 406. It should be noted that key material can be spilt or otherwise shared between two or more parties in a number of ways. For example, in other embodiments, the master key can be encrypted under the restore key, and the master key encrypted under the restore key can be spilt using any known secret splitting algorithm, such as Shamir's secret sharing algorithm. The spilt master key encrypted under the restore key can then be provided to two or more authorized customers, as described above.

When a restore operation is called 408, if each of the first restore key and the first restore key encrypted under the second restore are not provided to the cryptographic service, the restore operation aborts 410. If each of the first restore key and the first restore key encrypted under the second restore key is provided to the cryptographic service, then the restore operation can proceed. In accordance with an embodiment, the first restore key and the first restore key encrypted under the second restore key can be provided to the cryptographic service in any order. In various other embodiments, the key material is provided to the cryptographic service in a particular order. For example, the first restore key encrypted under the second restore key is provided to the cryptographic service before the first restore key. Upon receiving the key material from the first customer and the second customer, the cryptographic service first restores 412 the first restore key encrypted under the second restore key using the second restore key. The cryptographic service then restores 414 the master key encrypted under the first restore key using the first restore key.

In accordance with various embodiments, some of the quorum requirements may only be active after a particular period of time. For example, within a first period of time (e.g., 24 hours), the encrypted key material can be unilaterally restored, and a second period of time greater than the first period of time, the encrypted key material can require multiple parties to restore the encrypted key material. In various other embodiments, restoring key material can cause the cryptographic service to provide a notification to any authorized party of the key material that encrypted key material has been restored. Further, in some embodiments, causing the notification to be sent can cause decrypting the encrypted key material to be delayed at least a predetermined period of time. For example, in response to receiving a restore request, a notification can be sent to one or more authorized customers of the encrypted key material. At the expiration of a predetermined period of time (e.g., 15 minutes), the encrypted key is decrypted and made available for use.

Further, in accordance with various embodiments, a customer can enable a key recover function, where a key can be configured such that any attempt to shred or export key will cause an encrypted copy of the key to be sent to a predefined location. In some embodiments, the defined location might be configured to be unchangeable. In other embodiments, the location might be in an account different from the account in which the key was created, as configured by the customer, such that to import the key a request needs to be made in the context of either the creating account, a different authorized account, or both accounts.

Figure 5:
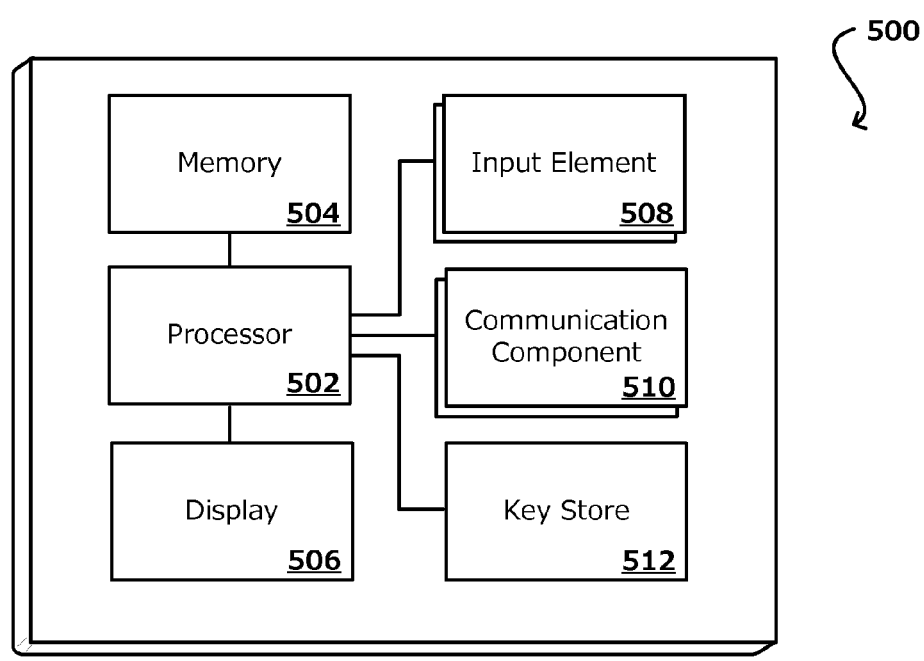
FIG. 5 illustrates example components of a client device.

FIG. 5 illustrates a logical arrangement of a set of general components of an example computing device 500. In this example, the device includes a processor 502 for executing instructions that can be stored in a memory device or element 504. As would be apparent to one of ordinary skill in the art, the device can include many types of memory, data storage, or non-transitory computer-readable storage media, such as a first data storage for program instructions for execution by the processor 502, a separate storage for images or data, a removable memory for sharing information with other devices, etc. The device typically will include some type of display element 506, such as a touch screen or liquid crystal display (LCD), although devices such as portable media players might convey information via other means, such as through audio speakers. As discussed, the device in many embodiments will include at least one input element 508 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 500 of FIG. 5 can include one or more communication elements 510, such as a Wi-Fi, Bluetooth, RF, wired, or wireless communication system. The device in many embodiments can communicate with a network, such as the Internet, and may be able to communicate with other such devices. The device 500 also can include at least one key store 512, which can be implemented through hardware and/or software. The key store can be a portion of memory, a portion of a local data store, etc. Access to the key store can be restricted to one or more applications, components, users, etc.

Figure 6:
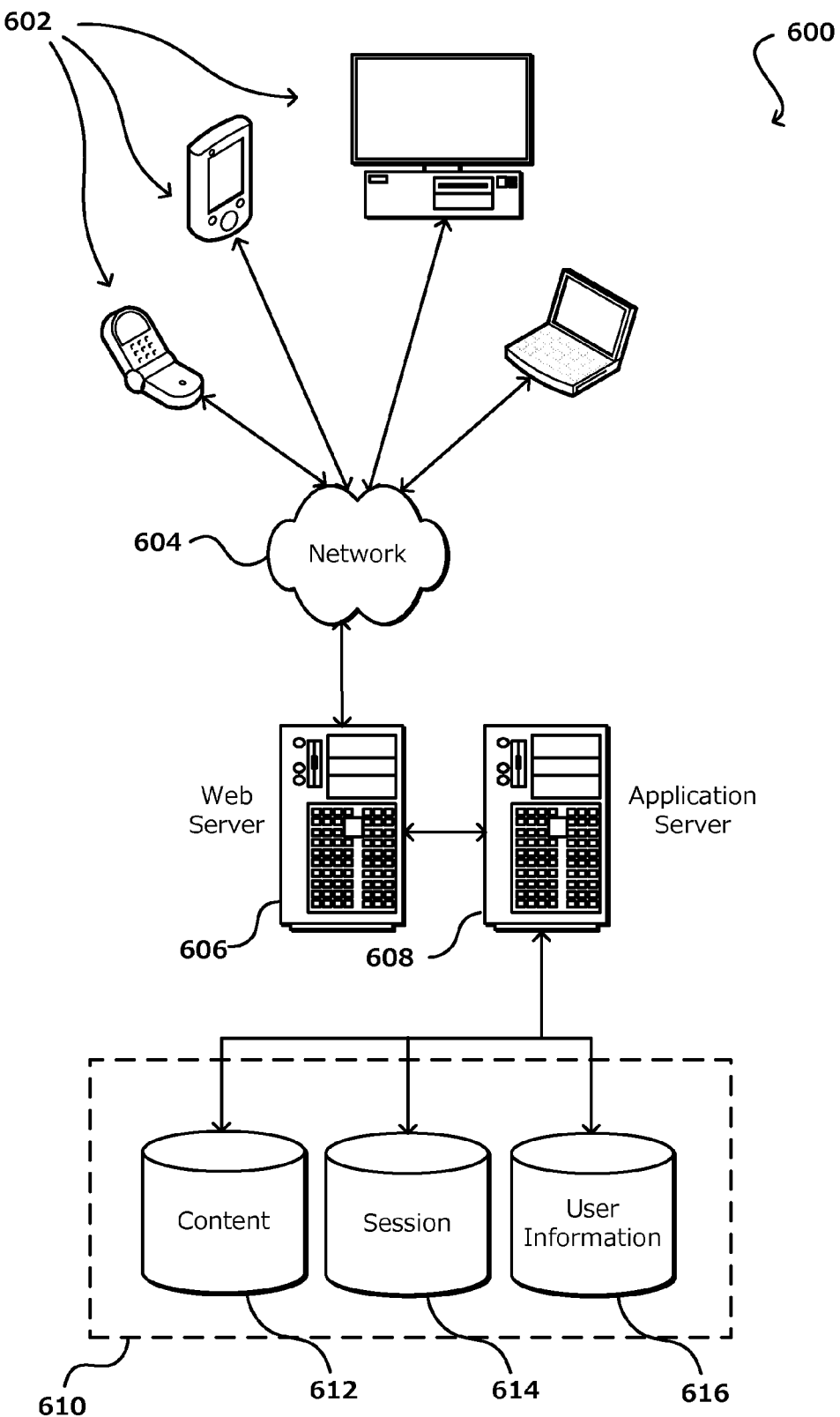
FIG. 6 illustrates an example of an environment for implementing aspects in accordance with various alternate embodiments.

As discussed, different approaches can be implemented in various environments in accordance with the described embodiments. For example, FIG. 6 illustrates an example of an environment 600 for implementing aspects in accordance with various embodiments. As will be appreciated, although a Web-based environment is used for purposes of explanation, different environments may be used, as appropriate, to implement various embodiments. The system includes an electronic client device 602, which can include any appropriate device operable to send and receive requests, messages or information over an appropriate network 604 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 606 for receiving requests and serving content in response thereto, although for other networks an alternative device serving a similar purpose could be used, as would be apparent to one of ordinary skill in the art.

The illustrative environment includes at least one application server 608 and a data store 610. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 602 and the application server 608, can be handled by the Web server 606. It should be understood that the Web and application servers are not required and are merely example components, as structured code discussed herein can be executed on any appropriate device or host machine as discussed elsewhere herein.

The data store 610 can include several separate data tables, databases or other data storage mechanisms and media for storing data relating to a particular aspect. For example, the data store illustrated includes mechanisms for storing production data 612 and user information 616, which can be used to serve content for the production side. The data store also is shown to include a mechanism for storing log or session data

614. It should be understood that there can be many other aspects that may need to be stored in the data store, such as page image information and access rights information, which can be stored in any of the above listed mechanisms as appropriate or in additional mechanisms in the data store 610. The data store 610 is operable, through logic associated therewith, to receive instructions from the application server 608 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 602. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the system 600 in FIG. 6 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method for managing a cryptographic key, comprising:
   storing, in a data store managed by a key management service, a cryptographic key for use in encrypting data for a customer of a service provider associated with the cryptographic key, the key management service being operated in a service provider environment of the service provider;
   receiving a suspend request to suspend storage of the cryptographic key by the key management service;
   generating a restore key to be associated with the customer;
   encrypting the cryptographic key with the restore key;
   encrypting at least a portion of metadata associated with the cryptographic key under the restore key to generate encrypted metadata, the at least a portion of metadata being associated with the restore key;
   updating the at least a portion of metadata with audit information and retaining a copy of the encrypted metadata at the key management service;
   sending, to the customer, the cryptographic key as encrypted under the restore key;
   destroying any copy of the cryptographic key stored by the key management service;
   receiving a restore request to cause to the key management service to store a copy of the cryptographic key, the restore request including a copy of the cryptographic key as encrypted under the restore key;
   comparing at least a copy of metadata received with the restore request with the copy of the encrypted metadata at the key management service;
   authorizing the restore request based at least in part on the comparing; and
   decrypting the copy of the cryptographic key as encrypted under the restore key using the restore key and storing the copy of the cryptographic key and a copy of the encrypted metadata in the key management service on behalf of the customer.

2. The computer implemented method of claim 1, wherein the audit information indicates at least one of a customer initiating the suspend request or a time of initiating the suspend request.

3. A computer implemented method, comprising:
   storing, on behalf of a customer, a local copy of a secret usable to perform operations in a service provider environment;
   receiving a request at a key management service in a service provider environment to suspend storage of the local copy of the secret;
   generating a restore key;
   encrypting the local copy of the secret with the restore key to generate the secret encrypted under the restore key;
   encrypting at least a portion of metadata associated with the secret under the restore key to generate encrypted metadata, the at least a portion of metadata being associated with the restore key;
   updating the at least a portion of metadata with audit information and retaining a copy of the encrypted metadata at the key management service;
   providing the customer the secret encrypted under the restore key;
   retaining the restore key and destroying the local copy of the secret;
   in response to a request to store a copy of the secret, the restore request including a copy of the secret encrypted under the restore key, comparing a copy of metadata received with the restore request with the copy of the encrypted metadata;
   authorizing the restore request based at least in part on the comparing; and
   decrypting the copy of the secret as encrypted under the restore key using the restore key.

4. The computer implemented method of claim 3, further comprising:
   making available the local copy of the secret to the customer to perform one or more operations using the local copy of the secret.

5. The computer implemented method of claim 4, wherein the secret is associated with at least one of one or more policies associated with the at least a portion of metadata, an identifier of an account in which the secret is associated with, a name of the secret, history information regarding use of the secret, or audit information associated with the secret.

6. The computer implemented method of claim 3, wherein the secret and the restore key are each cryptographic keys.

7. The computer implemented method of claim 6, wherein each of the cryptographic keys is associated with usage information operable to support one or more cryptographic operations, the one or more cryptographic operations including at least one of an export operation or an import operation.

8. The computer implemented method of claim 3, further comprising:
   in response to providing the customer a copy of the secret encrypted under the restore key, flagging the local copy of the secret as pending deletion;
   destroying any copy of the secret when an acknowledgment of receipt of the secret encrypted under the restore key is received; or
   providing the customer a copy of the secret encrypted under the restore key when a determined amount of time passes before the acknowledgment of receipt is received.

9. The computer implemented method of claim 3, further comprising rotating the restore key, wherein rotating the restore key includes:
   encrypting the restore key using a second restore key at an expiration of a determined interval of time and providing the customer a copy of the restore key encrypted under the second restore key; or in response to receiving a copy of the secret encrypted under the restore key, decrypting the secret encrypted under the restore key and encrypting the secret using a second restore key, wherein a copy of the secret encrypted under the second restore key is provided to the customer.

10. The computer implemented method of claim 3, further comprising:
encrypting the restore key under a second restore key;
providing a copy of the restore key encrypted under a second key to a second authorized customer, wherein the customer and the second authorized customer are authorized customers of the secret;
receiving a restore request, the restore request including a copy of the secret encrypted under the restore key and a copy of the restore key encrypted under the second key;
restoring the restore key encrypted under the second key using the second key; and
restoring the secret encrypted under the restore key using the restore key.

11. The computer implemented method of claim 4, further comprising:
causing a notification to be sent to at least one of each authorized customer of the secret or at least one authorized customer of the secret in response to receiving the restore request.

12. The computer implemented method of claim 11, further comprising:
in response to causing the notification to be sent, decrypting the copy of the secret encrypted under the restore key using the restore key at an expiration of a predetermined period of time.

13. The computer implemented method of claim 3, further comprising:
splitting the local copy of the secret into at least first information and second information using an information splitting algorithm; and
providing the first information to a first customer and the second information to a second customer,
wherein restoring the local copy of the secret includes receiving at least the first information and the second information.

14. A computing system, comprising:
at least one processor; and
memory including instructions that, when executed by the at least one processor, cause the computing system to:
store, on behalf of a customer, a local copy of a secret usable by a key management service;
receive a request at the key management service to suspend storage of the local copy of the secret;
encrypt the local copy of the secret with information usable to obtain the local copy of the secret;
encrypt at least a portion of metadata associated with the secret under the information to generate encrypted metadata, the at least a portion of metadata being associated with the information;
update the at least a portion of metadata with audit information and retain a copy of the encrypted metadata at the key management service;
provide the customer with one of the encrypted secret or the information usable to reconstruct the local copy of the secret;
destroy at least one copy of the local copy of the secret;
in response to store a copy of the secret, the restore request including a copy of the secret encrypted under the information, comparing a copy of metadata received with the restore request with the copy of the encrypted metadata;
authorizing the restore request based at least in part on the comparing; and
decrypting the copy of the secret key as encrypted under the secret using the restore key.

15. The computing system of claim 14, wherein the instructions, when executed, further cause the computing system to:
make available the local copy of the secret to the customer to perform one or more operations.

16. The computing system of claim 14, wherein the secret includes at least one of one or more policies associated with the at least a portion of metadata, an identifier of an account in which the secret is associated with, a name of the secret, history information regarding usage of the secret, or audit information associated with the secret; and
in response to receiving a restore request to store a copy of the secret, the restore request including a copy of the encrypted secret and the encrypted metadata, decrypt the copy of the encrypted secret and the encrypted metadata.

17. The computing system of claim 14, wherein the secret and the information configured to reconstruct the local copy of the secret are cryptographic keys generated by a provider environment, and wherein the information configured to reconstruct the local copy of the secret is configured to perform one of a suspend operation or a restore operation.

18. The computing system of claim 14, further comprising:
a key management service within a multi-tenant environment operable to at least store, receive, encrypt, provide, and destroy the secret, and
a trusted platform module (TPM) configured to store the secret, wherein the key management service is further operable to obtain exclusive access to the TPM and manage access to the secret stored on the TPM.

19. A non-transitory computer readable storage medium storing one or more sequences of instructions executable by one or more processors to perform a set of operations comprising:
storing, on behalf of a customer, a local copy of a secret;
receiving a request at a key management service to suspend storage of the local copy of the secret;
encrypting the local copy of the secret with a restore key;
encrypting at least a portion of metadata associated with the secret under the restore key to generate encrypted metadata, the at least a portion of metadata being associated with the restore key;
updating the at least a portion of metadata with audit information and retaining a copy of the encrypted metadata at the key management service;
providing the customer with the restore key;
destroying at least one copy of the local copy of the secret;
in response to a request to store a copy of the secret, the restore request including a copy of the secret encrypted under the restore key, comparing a copy of metadata received with the restore request with the copy of the encrypted metadata;
authorizing the restore request based at least in part on the comparing; and
decrypting the copy of the secret key as encrypted under the secret using the restore key.

20. The non-transitory computer readable storage medium of claim 19, further comprising instructions executed by the one or more processors to perform the operations of:
making available the local copy of the secret to the customer to perform one or more operations.

21. The non-transitory computer readable storage medium of claim 19, further comprising instructions executed by the one or more processors to perform the operations of:
- in response to providing the customer a copy of the restore key, flagging the local copy of the secret as pending deletion;
- destroying at least one copy of the secret when an acknowledgment of receipt of the restore key is received; or
- providing the customer a copy of the restore key when a determined amount of time passes before the acknowledgment of receipt is received.

22. The non-transitory computer readable storage medium of claim 19, wherein storing, receiving, encrypting, providing, and destroying are performed by a key management service within a multi-tenant environment.

* * * * *